(No Model.) 3 Sheets—Sheet 2.
G. W. MOON.
SEED DROPPER.
No. 368,349. Patented Aug. 16, 1887.
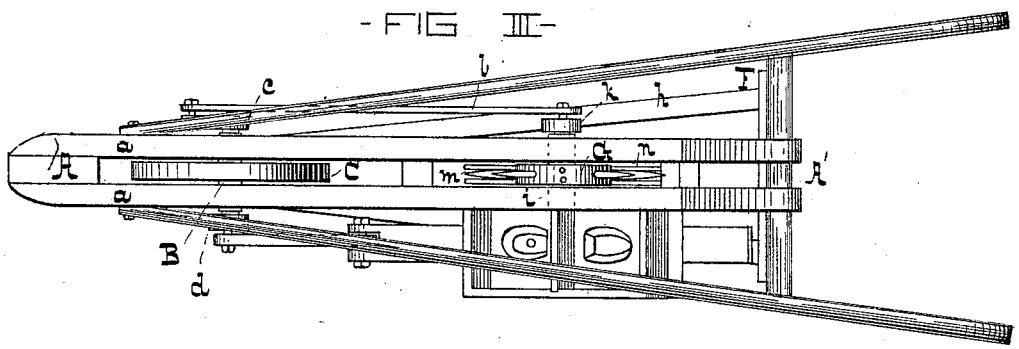
FIG. III
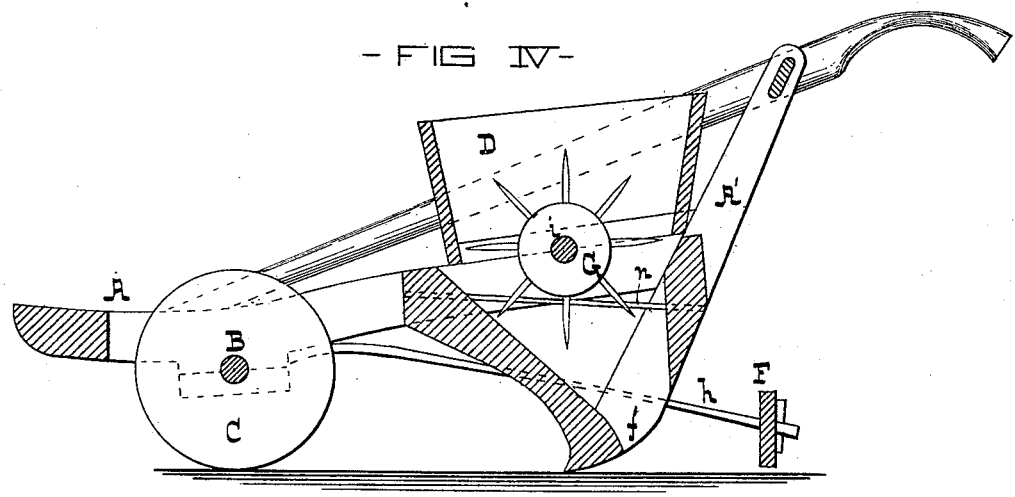
FIG. IV
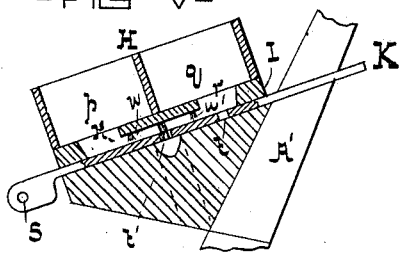
FIG. V
WITNESSES
Dan'l Fisher
S. Daviswarfield
INVENTOR
George Washington Moon,
by G. W. T. Howard,
Atty.

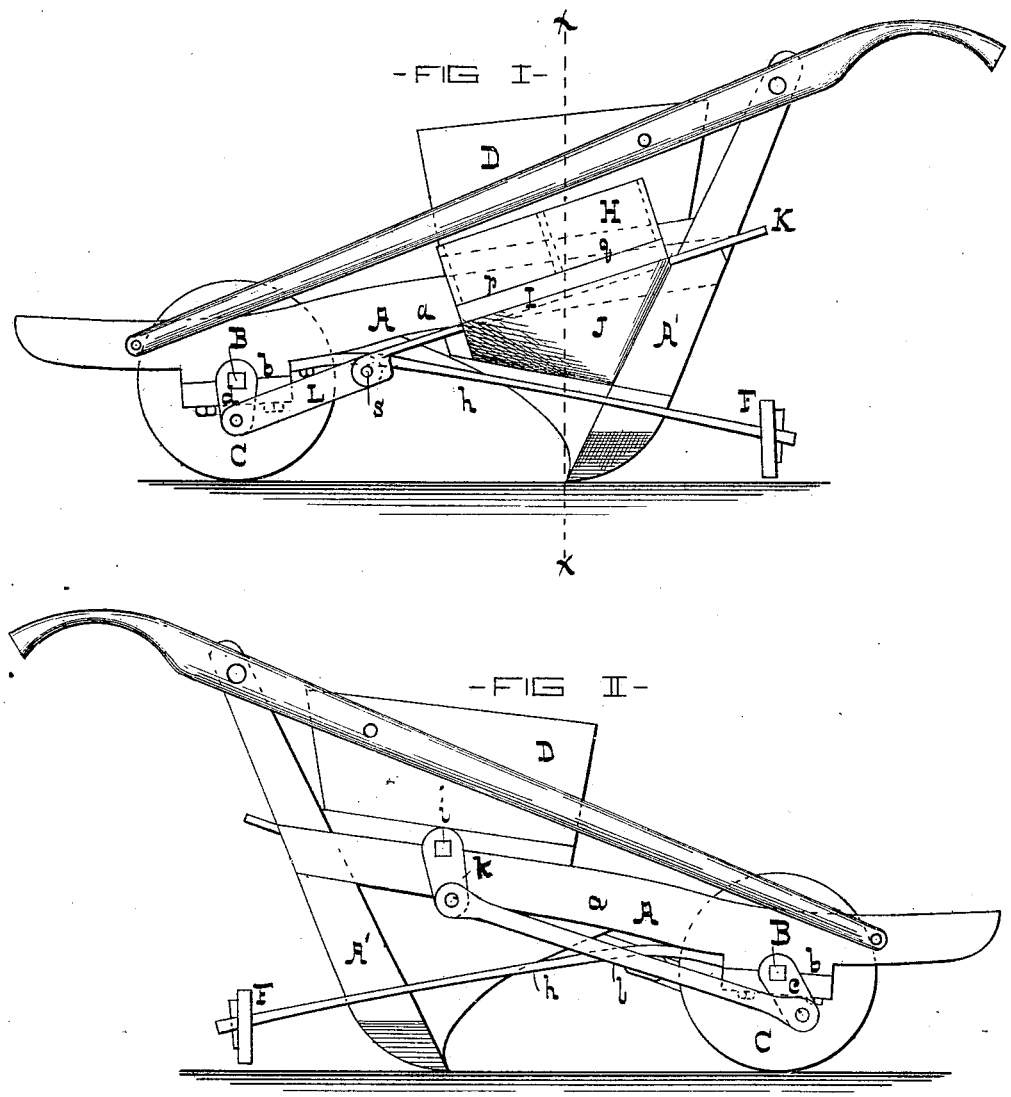

(No Model.) 3 Sheets—Sheet 3.
G. W. MOON.
SEED DROPPER.
No. 368,349. Patented Aug. 16, 1887.
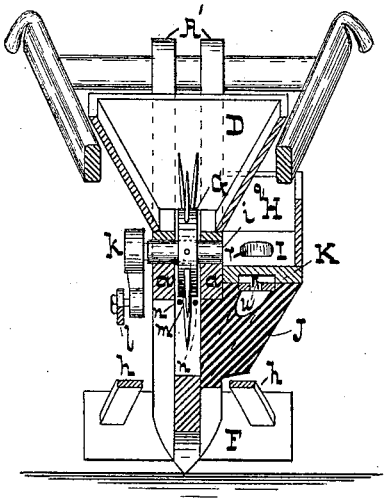
-FIG VI-
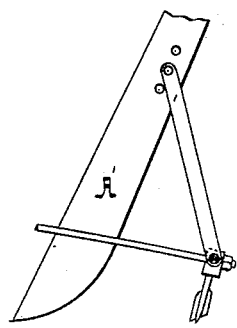
-FIG VII-
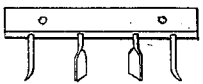
-FIG VIII-
-WITNESSES-
Dan'l Fisher
S. Davies Warfield
-INVENTOR-
George Washington Moon,
by Wm. T. Howard,
atty.

UNITED STATES PATENT OFFICE.

GEORGE WASHINGTON MOON, OF SPARTA, LOUISIANA, ASSIGNOR OF ONE-HALF TO BENJAMIN WALLIS, OF BALTIMORE, MARYLAND.

SEED-DROPPER.

SPECIFICATION forming part of Letters Patent No. 368,349, dated August 16, 1887.

Application filed January 17, 1887. Serial No. 224,551. (No model.)

*To all whom it may concern:*

Be it known that I, GEORGE WASHINGTON MOON, of Sparta, in the parish of Bienville and State of Louisiana, have invented certain Improvements in Seed-Droppers, of which the following is a specification.

The object of this invention is to combine in one machine or apparatus such devices and appliances as will admit of the planting and fertilizing at one time of several varieties of seed—such as cotton, corn, and peas; and the said invention consists in certain novel combinations of parts to effect the aforesaid result, as will hereinafter appear.

In the further description of the said invention which follows, reference is made to the accompanying drawings, forming a part thereof, and in which—

Figure I is an exterior side elevation of the improved seed-planter. Fig. II is a reversed side elevation of the machine. Fig. III is a plan of the invention, the hopper for the cotton-seed being removed. Fig. IV is a sectional view of the hopper which is intended to contain cotton-seed or fertilizer, and Fig. V a similar section of the hopper in which the corn and peas are placed, together with the seed-dropping devices. Fig. VI is a transverse section of Fig. I taken on the dotted line X X. Fig. VII is an enlarged view of certain parts of the machine, hereinafter described. Figs. VII and VIII illustrate a modification in the invention.

In the said drawings, A is the horizontal frame of the machine, preferably formed of two separated sections, $a\ a$, having bearing-boxes $b\ b$, in which the main or driving shaft B is adapted to revolve. To this shaft is secured, in any suitable manner, the driving-wheel C, the length of circumference of which governs the feed from the cotton-seed hopper and the distance apart which the corn and peas are dropped, as will be hereinafter described. This wheel is shown as having a plain or smooth edge, which is preferred; but it may have projections on its periphery to increase its traction, if such arrangement is desired. The shaft B has a crank at either end thereof. (Represented in the drawings by $c$ and $d$.) The crank $c$ serves to operate the feeding mechanism in the cotton-seed hopper and the one $d$ to actuate the corn and the pea dropping devices, as will hereinafter appear.

D is a cotton-seed hopper of any appropriate shape, secured to the frame A, and arranged to extend considerably above the same, as shown. The separated sections of the frame A, below the hopper D, are extended in a downward direction and attached to the foot A', and the space between them forms a continuation of the hoppers, which terminates in an opening, $f$, in foot A', from which all the seeds finally escape to a furrow or trench cut in the earth. The lower end of the foot A' is pointed and shod with iron in order that as the machine is propelled a furrow may be formed in the earth into which the seed is dropped.

F is a covering-board held to the under side of the frame A by means of the spring-bars $h$. This board fills in the furrow or trench and covers the seed dropped therein. A beam having teeth, as shown in Figs. VII and VIII, may be substituted for the board F, if desired.

G is a spiked wheel fastened to the shaft $i$, which extends through the lower or contracted portion of the hopper D and is provided with a crank, $k$, at one end, which is connected to the crank $c$ on the driving-shaft by means of the pitman-rod $l$. By this arrangement, during the revolutions of the driving-shaft and its wheel, the spiked wheel G vibrates in the contracted space $m$ in the lower end of the cotton-seed hopper, through which the cotton-seeds are regularly and uniformly forced, and in order that the feed may be regulated the width of the space is adjustable. This contracted space is shown as formed by inserting in the neck of the hopper two rods, $n$, which may be moved laterally in slots to increase or diminish the space between them. A part of the upper spikes of the wheel G are double, and thus serve more effectually to keep the bulk of the cotton-seed in the hopper D in a state of agitation, and thus prevent the seed from being clogged in the hopper. The hopper for the corn and peas is denoted by H, and it is situated at one side of the hopper D and fastened to the frame A. This hopper is provided with a partition, which divides it into the two sections p and q, the former for corn and the latter for peas. This partition is, however, removable, so that the entire hopper H can be filled with one kind of seed.

The hopper-bottom is formed of a plate, I, which has openings r r directly under each section of the hopper, and these holes communicate by means of a curved funnel, J, with the lower portion of the hopper D and at a point in the same beneath the spiked wheel G therein.

Immediately under the bottom plate, I, of the hopper H is a sliding plate, K, connected at s with the crank d on the driving-shaft, by means of a pitman-rod, L, similar in character to the one, l, before alluded to. This sliding plate is provided with two holes, t t, of a size somewhat larger than the seed to be dropped, and the relative positions of these holes and the apertures in the bottom plate, I, are such that at each stroke of the sliding plate K one or more seeds are taken from each section of the hopper H and carried to the curved funnel, from which it falls to the passage from the hopper D, and thence to the furrow.

In order that the surface of the sliding plate may be kept free from the adherence of any foreign matter carried with the grain, I provide the under surface of the bottom plate of the hopper H with brushes u u, of bristles or wire, and to enforce the discharge of the grain in a downward direction from the said holes I make the central brush longer than the others, so that it will extend entirely through the holes of the sliding plate, as shown in Figs. V and VI.

The operation of the invention is extremely simple. The machine is first provided with the seed to be planted or dropped, and with some fertilizer, if fertilizer is to be fed with the seed, and the machine then propelled by hand, horse-power, or by any other suitable means, when the various seeds are uniformly dropped and covered, as before stated.

I claim as my invention—

1. In a seed-planter, a frame formed of two separated sections, a hopper placed on the upper side of the said frame, the sections of the frame forming a contracted portion of the said hopper, a second hopper adapted to discharge into the contracted portion of the first, and feed devices to discharge the seed from the said hoppers, substantially as and for the purpose specified.

2. In a seed-planter, a frame formed of two separate sections, said sections extending downward and forming an opening for the discharge of the seed, combined with a hopper having a perforated bottom, a perforated sliding plate situated under said bottom and capable of being reciprocated by means of a crank-connection with the driving mechanism of the seed-planter, and a funnel forming a communication between the holes in the sliding plate and the discharge opening, substantially as specified.

3. In a seed-planter, a frame formed of two separate sections, said sections extending downward and forming an opening for the discharge of the seed, combined with a hopper having a perforated bottom, a series of brushes secured to the under side of the said bottom, one of them projecting beyond the others, a sliding plate situated under the bottom of the hopper and having holes therein, into which the longer brush is adapted to project, and a funnel forming a communication between the holes in the sliding plate and the discharge-opening, substantially as and for the purposes specified.

GEORGE WASHINGTON MOON.

Witnesses:
THOS. J. MAUGHAM,
BEN P. EDWARDS.